May 14, 1963     A. J. CULLINANE     3,089,736
BEARINGS
Filed Dec. 9, 1960
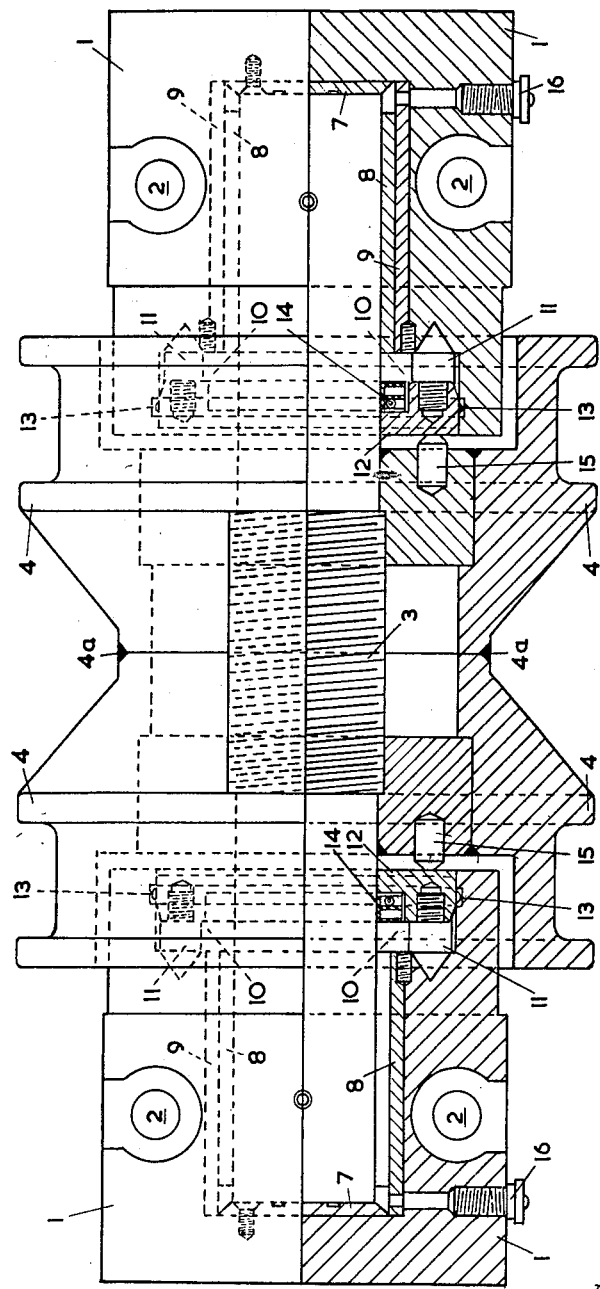
INVENTOR;
Alfred James Cullinane
By W.B.Harpman
ATTORNEY

3,089,736
BEARINGS
Alfred James Cullinane, Binnegar Farm, East Stoke,
Wareham, England
Filed Dec. 9, 1960, Ser. No. 74,904
5 Claims. (Cl. 308—36.1)

This invention relates to bearing assemblies and more particularly, although not exclusively to bearing assemblies for the tracks of continuous track type tractors, bull dozers etc.

The tracks of continuous track type tractors are prevented from undergoing upward movement away from the ground by bearings mounted on shafts on the frame of the tractor. These bearings are therefore near to the ground and sand and grit is likely, unless they are tightly sealed, to enter the bearings and cause damage to the bearing surfaces.

In conventional constructions, due to the considerable forces to which the bearings are subjected, as for example when the tractor is passing over uneven ground and is heeling over to one side, the seals between the shafts carried by the tractor and frame and the bearings mounted thereon have become fatigued and sand and grit has been able to penetrate the bearings.

It is an object of the present invention to provide a bearing assembly the construction of which is such that the chances of sand and grit penetrating the bearing are greatly minimised and such that should sand or grit penetrate the bearing it will not damage the bearing surfaces.

According to the present invention there is therefore provided a bearing assembly comprising a track roller mounted on a shaft supported at each end within a housing having a bearing surface provided therein, each said housing being provided also with an annular cavity closed by a sealing plate, the arrangement being such that lubricant in the bearing housings passes between the bearing surfaces of the housings and the shaft and collects in said annular cavity from which it escapes past the sealing plate.

Preferably the track roller is formed with a cavity on each side into which the bearing housings project, the track roller being provided on each side with three studs which maintain the desired axial displacement between the track roller and the bearing housings, the arrangement being such that once lubricant has escaped from the annular cavities within the bearing housings it collects in the cavities in the track roller from whence it eventually escapes.

One mode of carrying the present invention into effect will now be described, by way of example, with reference to the diagrammatic drawing accompanying this specification, which drawing shows a plan view partly in section of a bearing assembly according to the present invention for the tracks of a continuous track type tractor. The bearing assembly comprises two housings 1 which are adapted to be mounted on the tractor frame by means of bolts passing through eyes 2. A shaft which is bourne at each end by bearing surfaces within the bearing housings 1 rigidly carries a track roller 4 over which the track of the tractor passes. The track roller 4 is formed in two parts which are each screwed onto the shaft 3 and are welded together at 4a. At each end the shaft 3 bears against bearing plates 7 mounted in the housings 1. The shaft 3 carries at each end a steel sleeve 8 the outer surface of which bears against a Phosphor-bronze bearing sleeve 9 mounted in the housings 1. Each housing 1 is formed with an annular cavity 10 at its open end. The end wall of this cavity is provided with three depressions in which three studs 11 mounted on a sealing plate 12 engage, the length of the studs 11 being such as to leave a space in which lubricant can collect between the end wall of the cavity and the inner face of the sealing plate 12. The sealing plates 12 are kept in position on the housing by ball bearings 13, and are each provided with a leather oil seal 14 formed with the two concentric flanges secured to the sealing plate, and a circular spring urging the seal into contact with the shaft 3. The track roller 4 has three studs 15 mounted on its opposite side faces against which the outer faces of the sealing plates 12 abut. The studs 15 ensure that the track roller remains axially spaced from the bearing housings 1. Lubricant in the form of grease is injected into the bearing housing through an injection nozzle 16. The arrangement is such that lubricant injected into the bearing housing through the nozzle 16 passes between the bearing surfaces of the steel sleeve 8 and the Phosphor-bronze sleeve 9 and collects in the annular cavity 10. When the pressure of the lubricant in the housing is sufficient, the lubricant passes under the seal of the housing into the space between the track roller 4 and the sealing plate 12 from whence it can eventually escape. Should any grit or sand pass into the space between the track roller 4 and the sealing plate 12, in order to penetrate further into the bearing it will have to move against the flow of lubricant. However, should any grit or sand penetrate the bearing housing 1 it will collect in the cavity 10 from which it will be gradually expelled by lubricant escaping under the seal 14 and it will be prevented from penetrating further into the bearing and damaging the bearing surfaces by the flow of lubricant from the bearing surfaces.

It will be appreciated therefore that the present invention provides a bearing assembly, the construction of which is such that grit or sand cannot enter sufficiently far into the bearing housing to damage the bearing surfaces.

It will also be appreciated that the foregoing details are given by way of example only and that any desired modifications, within the scope of the appended claims, may be made to the invention in order to suit varying requirements.

I claim:

1. A bearing assembly including a track roller, a shaft extending from each end of the track roller so as to rotate therewith, two housings, one for each shaft end, a bearing surface in each housing for rotatably supporting the shaft end that is housed therein, an annular cavity in each housing between the bearing surface therein and the track roller, a sealing plate surrounding each shaft end and closing the annular cavity in the housing, a lubricant passage extending into each housing and from which injected lubricant is forced to flow over the bearing surface in the housing before reaching the annular cavity from whence it can escape past the sealing plate, and a cavity in each side face of the track roller and into which said housings project, there being means in each cavity in the track roller to maintain an annular space between each sealing plate and the opposed end wall of the cavity of the track roller such that lubricant escaping past the sealing plates can collect in these annular spaces.

2. A bearing assembly as claimed in claim 1 in which said means in the cavity of the track roller comprises axially extending studs mounted in the track roller.

3. A bearing assembly as claimed in claim 1 wherein the bearing surface in each housing is a cylindrical sleeve.

4. A bearing assembly as claimed in claim 1 in which each sealing plate extends into the annular cavity in its associated housing, there being axially extending stud members between each sealing plate and its associated housing to space the sealing plate from the bearing surface in the housing.

5. A bearing assembly as claimed in claim 1 in which each sealing plate is provided with an oil leather seal surrounding the shaft, the oil leather seal being within the annular cavity in the housing.

References Cited in the file of this patent
UNITED STATES PATENTS

| | | |
|---|---|---|
| 2,483,345 | Lee | Sept. 27, 1949 |
| 2,801,117 | Bourgeois | July 30, 1957 |
| 2,955,001 | Rich | Oct. 4, 1960 |